US006877827B2

(12) United States Patent
Holighaus et al.

(10) Patent No.: US 6,877,827 B2
(45) Date of Patent: Apr. 12, 2005

(54) SWITCH CABINET WITH A RACK

(75) Inventors: Heiko Holighaus, Eschenburg (DE); Michael Bach, Siegbach (DE); Samuel Klassen, Haiger (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/194,434

(22) Filed: Jul. 12, 2002

(65) Prior Publication Data

US 2004/0007951 A1 Jan. 15, 2004

(51) Int. Cl.$^7$ ............................................. A47B 97/00
(52) U.S. Cl. ..................... 312/223.1; 312/213
(58) Field of Search ................... 312/265.1, 265.2, 312/265.3, 265.4, 257.1, 263, 326, 329, 400, 223.1, 265.5, 100, 213, 290; 211/26, 189, 191; 174/50, 59, 60; 361/826

(56) References Cited

U.S. PATENT DOCUMENTS 2,980,482 A * 4/1961 Baio ....................... 312/265.1
5,573,319 A * 11/1996 Dirk ........................... 312/100
5,971,511 A * 10/1999 Diebel et al. ............. 312/265.3
6,401,940 B1 * 6/2002 Hartel et al. .................. 211/26
6,467,640 B1 * 10/2002 Hung ........................ 220/4.02

FOREIGN PATENT DOCUMENTS

| DE | 26 56 943 | 6/1978 |
| DE | 195 03 801 | 5/1996 |
| DE | 195 07 731 | 5/1996 |
| DE | 198 17 163 | 3/2000 |

* cited by examiner

Primary Examiner—Janet M. Wilkens
(74) Attorney, Agent, or Firm—Pauley Petersen & Erickson

(57) ABSTRACT

Switch cabinet with a rack that can be closed or is closed by at least one double-walled cabinet door, two side walls, a back wall and a top wall, where the side walls and the back wall in each case consist of an internal wall and an external wall and are attached to the rack and where a cover hood is placed on the top wall, the cover hood being hinged in the vicinity of the back wall, and can be made fast in the vicinity of the cabinet door in the closed position. By a special angling-off of the internal walls and external walls of the side walls and the back wall which are constructed as double walls, a simple and reliable attachment of the external walls is made possible.

23 Claims, 4 Drawing Sheets

SWITCH CABINET WITH A RACK

Figure 1:
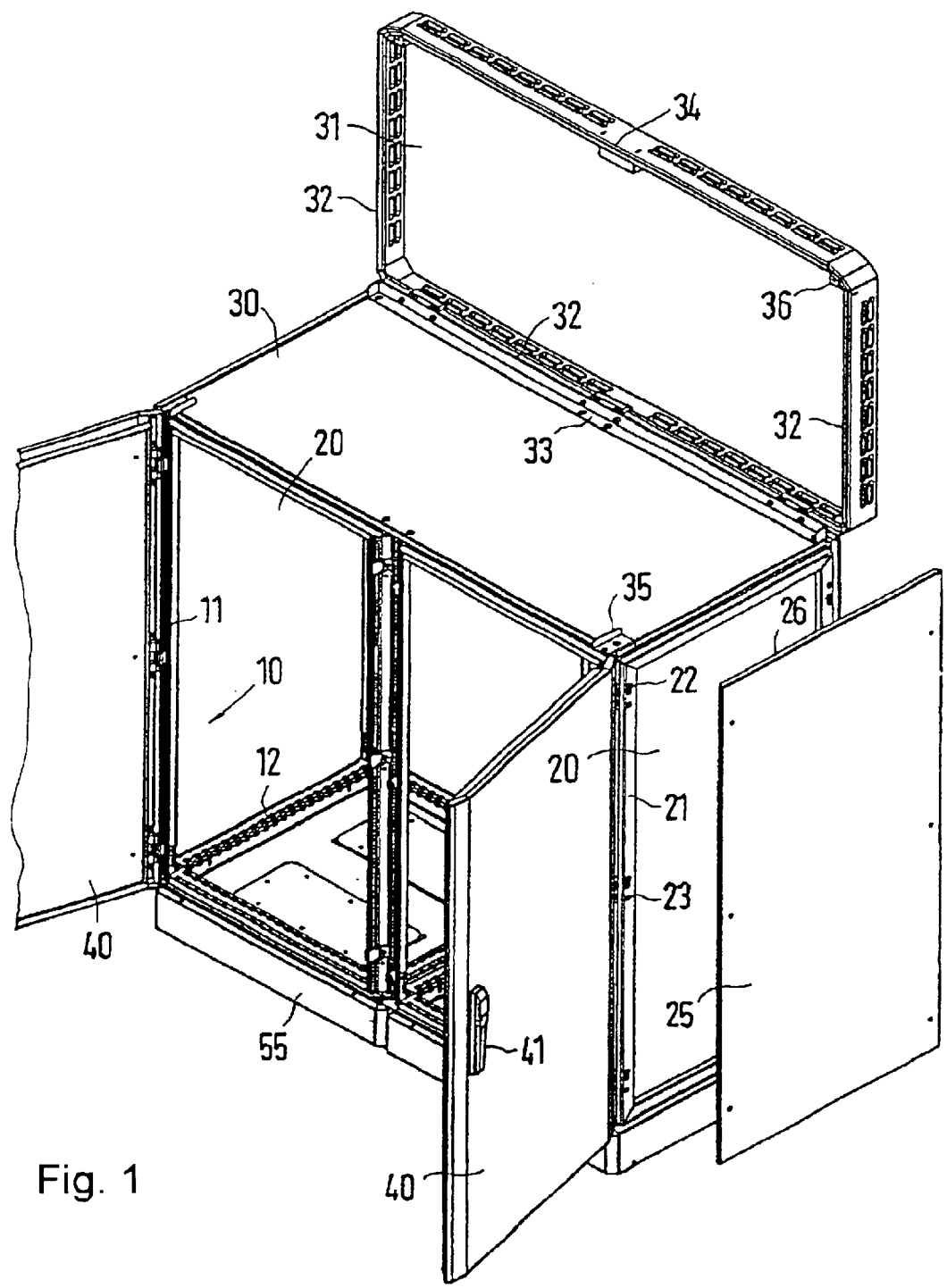

The invention relates to a switch cabinet with a rack that can be closed or is closed by means of at least one double-walled cabinet door, two side walls, a back wall and a top wall, where the side walls and the back wall in each case consist of an internal wall and an external wall and are attached to the rack, and where a cover hood is placed on the top wall, said cover hood being hinged in the vicinity of the back wall and made fast in the closed position, in the vicinity of the cabinet door.

Such switch cabinets are primarily used in the open air, where in particular the double-walled design of the sheathing of the rack increases safety against vandalism, and the spaces formed between the internal and the external walls, in connection with the cover hood serve the function of improving ventilation.

In order to avoid providing attachment points for the double walls that are accessible from the outside and can be disconnected, the internal wall is attached to the internal side of the external wall, and the assembled double wall is connected to the rack from the interior space. This type of attachment of the double walls as the side walls and as the back wall of the switch cabinet is not only complicated, but also it limits the internal and external design and the design of seal of the double wall at the rack.

The problem of the invention is to simplify and facilitate attachment of the internal and external wall in a switch cabinet of the type mentioned in the introduction, without restrictions in the design and in the covering of the internal and the outer walls.

This problem is solved according to the invention by the fact that the external walls of the side walls and the back wall have, at least in the area of their upper, angled-off flanges, have on their internal sides suspension elements that can be suspended in hanging receptacles of the vertical frame leg and/or the internal walls that are connected to the rack, and in that the closed cover hood, with pressure elements that are placed on the terminal bends of the side walls of the cover hood, is supported on the flanges of the suspended external walls and secures their suspended positions.

In this configuration, the internal walls can be attached to the rack directly from the outside, in particular by means of screws. The cover hood is in the open position. The external walls are then simply hung on the rack and/or on the internal walls that are attached to it. To finish, one needs only to bring the cover hood into the closed position, wherein the external walls are automatically secured in their suspended positions. In the process, the closed position of the cover hood can be secured, in a known manner, by the closed cabinet doors.

In a configuration where the internal walls are screwed to the rack, where they are supported and sealed by angled-off sections on the external profile sides of the frame legs of the rack, and with additional angled-off sections these are inserted into recess spaces of the vertical frame of the rack, the external dimensions of the switch cabinet are then not unnecessarily enlarged by the double walls, because the internal walls find their place in the opposing reception spaces of the vertical frame of the rack, which spaces are enclosed by the associated horizontal and vertical frame legs of the rack.

An additional possibility for EMV shielding of the switch cabinet is given because the additional angled-off sections are oriented perpendicularly with respect to the associated external wall, and because they run parallel to additional profile sides of the frame legs and are shielded with respect to the latter with EMV sealing elements.

The penetration of rain water into the side walls and the back wall, flowing from the cover hood, is prevented in that the terminal bends of the side walls of the cover hood transition into the side walls by way of projecting and lowered drip edges that cover the transitions formed between the terminal bends, the pressure elements, and the flanges of the external walls.

The same purpose can be achieved in that the terminal bends of the side walls of the cover hood transition into the side walls, by way of a sight and protection edge, which is angled-off at a double right angle downward and outward, that covers the transitions formed between the terminal bends, the pressure elements, and the flanges of the external walls, where the sight and protection edges can completely cover hood the transitions from the cover hood to the switch cabinet proper.

A closed air duct with air inlet opening can thus be achieved for each side wall and back wall by the fact that the external walls on the horizontal upper edge and the vertical side edges are provided with angled-off flanges, and by the fact that in the area of the horizontal lower edge the external walls form at least one air inlet leading to the internal walls. In this context, the arrangement is such that the internal walls which extend into the reception space of the vertical frame of the rack assume a position with a predetermined separation from the external walls.

For a free air flow out of these air ducts, the arrangement is such that the external walls form a ventilation slit, leading to the angled-off sections that cover the external profile sides, which opens into the closed cover hood, and by the fact that the side walls of the cover hood are provided with air outlet openings.

According to a particularly advantageous embodiment, suspension of the external walls is simplified by the fact that the suspension elements are designed in the form of bolts with a bolt head at the free end, and the hanging recesses are designed as keyholes whose upper inlet openings are matched to the diameter of the bolt heads, and whose continuing retaining slots are matched, as far as their width is concerned, to the diameter of the bolts.

To prevent the hinged attachment of the cover hood from having a negative effect on the suspension or possible removal of the external wall of the back wall of the switch cabinet, the arrangement, moreover, is such that the cover hood in the opened state is hinged in such a manner and at such a distance from the rack that a vertical free space is formed, above the flange of the suspended external wall used for the back wall, for the hanging pathway of the external wall with flange.

Figure 2:
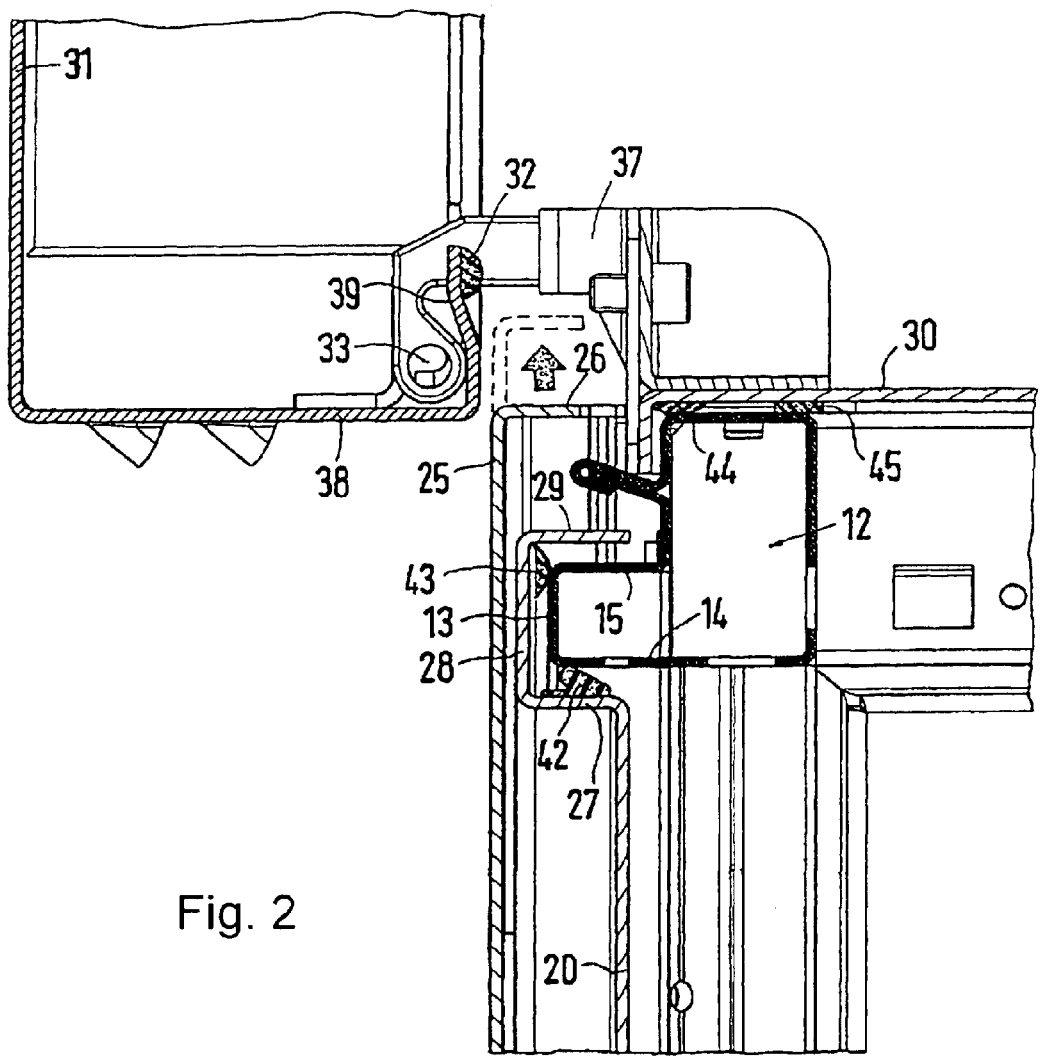

The invention is further explained with reference to an embodiment example represented in the drawing. In the drawing:

FIG. 1 shows a switch cabinet with rack with opened cabinet doors and opened cover hood, and with removal of one external wall of a side wall, FIG. 2 shows a partial cross section in the area of the back wall, and the hinged connection of the cover hood.

Figure 3:
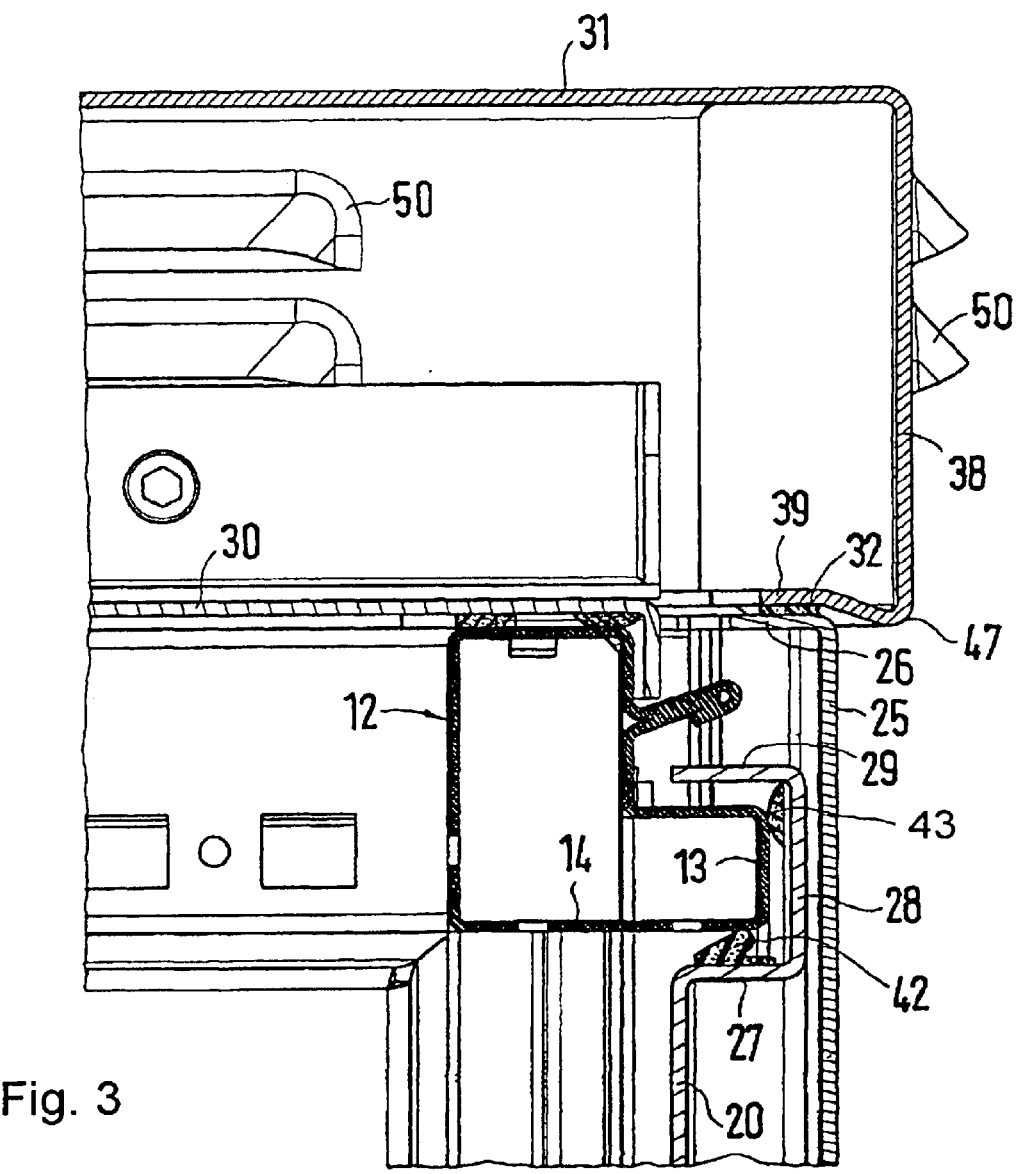
Figure 4:
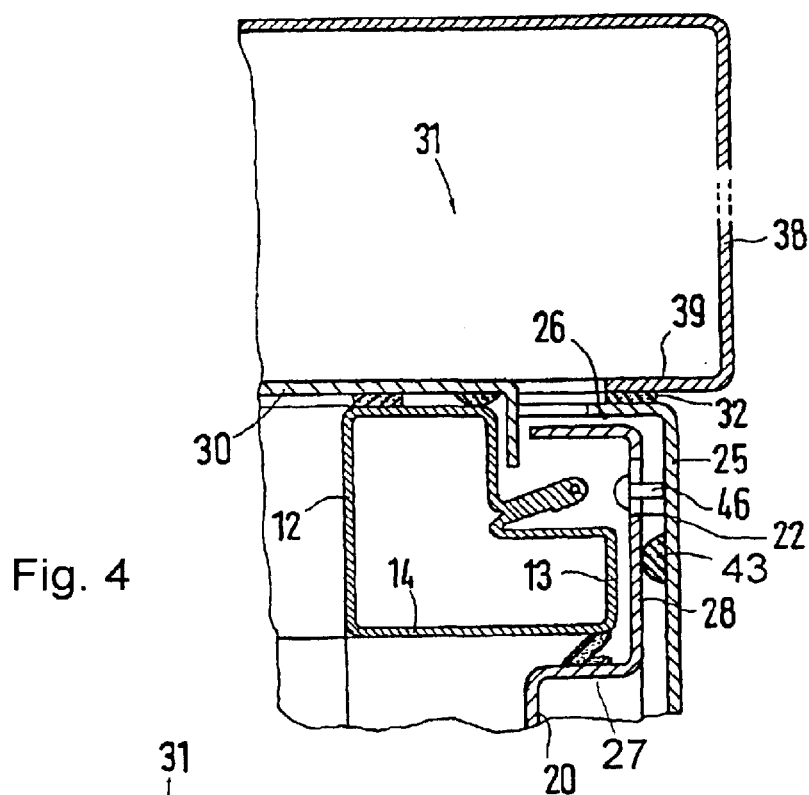
Figure 5:
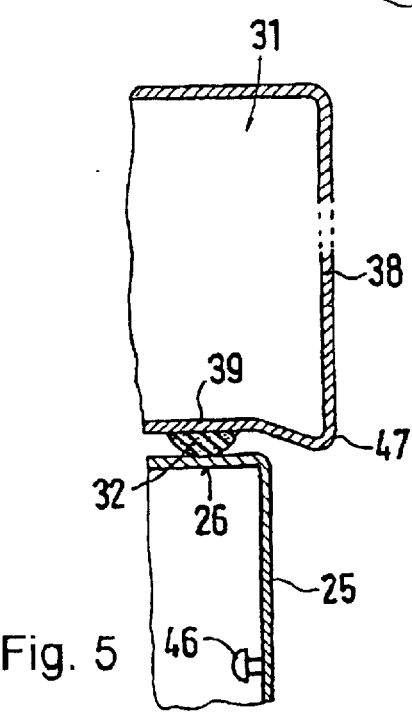
Figure 6:
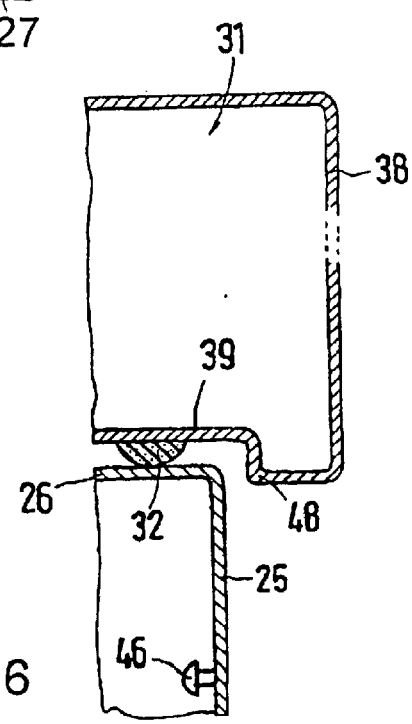

FIG. 3 shows a partial cross section in the area of a side wall and the upper edge of a double wall, FIG. 4 shows a partial cross section, corresponding to FIG. 3, with the hanging connection of the external wall, FIG. 5 is a partial cross section of the transition from the closed cover hood with drip edge to the external wall of the side wall, and FIG. 6 shows a partial cross section of the transition from the closed cover hood with sight and protection edge to the external wall of a side wall.

As shown in FIG. 1, a rack 10, which is assembled from vertical frame legs 11 and horizontal frame legs 12, forms the basic element of the switch cabinet, whose open sides are to be closed, in order to accommodate in its interior space electrical and/or electronic components and component groups. In this context, if the switch cabinet is to be installed in the open air, special requirements exist with regard to security against vandalism and the possibilities for ventilation, which are best satisfied by a double wall design of the jacketing.

As shown in the embodiment according to FIG. 1, the open front side of the rack 10 is closed by means of two double-walled cabinet doors 40, wherein both cabinet doors 40 are made fast in the closed position by means of a lever lock 41. The bottom side of the rack 10 is closed by means of a base part 55, while a top wall 30 closes the upper side of the cabinet.

In the present invention, the design of the side walls and the back wall as double walls, as well as their attachment to the rack 10, are of crucial importance.

A cover hood 31 is pivotably connected in the vicinity of the upper edge of the back wall, as shown by the hinge elements 33. A securing element 35 is attached in the vicinity of the upper edge of the front side, by means of which the cover hood 31 can be rigidly secured in the closed position. In addition, the side wall 38 of the cover hood 31 can have closing element 34 and counter element 36 for the securing element 35.

The side wall 38 of the cover hood 31 undergoes a transition leading to a terminal bend 39 that is angled-off inward, and which carries a pressure element 32. The hinge axis of hinge element 33 is located outside of the external contour of the switch cabinet, as shown in FIG. 2. The hinge parts 37 are attached to the top wall 30. If the cover hood 31 is open, then a vertical free space is created above the back wall that allows the introduction of the external wall 25 with the flange 26 during the suspension, as shown by the arrow in FIG. 2.

The back wall consists of an internal wall 20 and an external wall 25. The internal wall 20 is angled-off three times at least in the area of the upper edge, and it forms a U-shaped receiver with the angled-off sections 27, 28 and 29. The upper, horizontal frame leg 12 of the rack extends into this recess of the internal wall 20 with profile sides 13, 14 and 15. Here, a sealing element 43, which provides a seal against water spray, is provided between the external profile 13 and the angled-off section 28, while an EMV sealing element 42 can effect an electric and/or magnetic shielding between the profile side 14 and the angled-off section 27.

The external profile side 13 and the angled-off section 28 run parallel to the plane of the back wall, while the profile sides 14 and 15, as well as the angled-off sections 27 and 29, are perpendicular to these planes. The angled-off section 29 gives rigidity to the internal wall 20 in the area of the angling-off. The internal wall 20 can also be similarly angled-off on its vertical side, and it receives the opposing vertical frame legs 11. Sealing and shielding can also be effected in the same manner.

The lower edge of the internal wall 20 can be attached, sealed, and shielded at the bottom, horizontal frame leg 12.

The top wall 30 is supported on the horizontal profile side of the horizontal frame leg 12, as can be seen in FIG. 2, where sealing elements 44 and 45 can be used.

The external wall 25 carries, at least in the region of the upper edge, a flange 26, which can also be continued over the vertical sides.

The angled-off sections 28 of the internal wall 20 are provided, at least on the vertical sides, with keyholes as hanging recesses 22, where the introduction opening is located at the top and the retaining slots of the latter [opening] are directed downward. The internal walls 20 are screwed to the opposing frame legs 11 with attachment elements 23, shown in FIG. 1. On the internal side, the internal walls 20 [sic; external walls 25] carry appropriately distributed hanging elements 46, which are designed in the form of bolts with a bolt head. In the lifted position (FIG. 2), the hanging elements 46 are introduced into the hanging recesses 22. Because of its intrinsic weight, the external wall 25, when it is released, automatically assumes its hanging position. The hanging connection is designed such that a ventilation gap remains between the external wall 25 and the angled-off sections 28 of the internal wall 20, through which air that ventilates the space between the internal wall 20 and the external wall 25 reaches the closed cover hood 31 and can exit to the outside through air outlet openings 50.

In the side walls, when the cover hood cap 31 is opened, hanging the external wall 25 in the hanging recesses 22 of the internal walls 20, which have already been attached by screwing, presents no difficulties. If the cover hood 31 is closed, then the pressure elements 32 that are attached to the terminal bends 39 of the side walls 38 of the cover hood 31 ensure the hanging position of the two external walls 25 of the side walls of the switch cabinet sheathing, as shown in FIG. 3. Sealing and shielding can be effected, in unchanged form, according to FIG. 2.

The terminal bend 39 of the side walls and of the back wall can project as a drip edge 47 on the opposing external wall 25, as can be seen in FIGS. 3 and 5. In the process, the drip edge 47 covers the transition from the terminal bend 39 to the pressure element 32 and to the flange 26 of the external wall 25. Here this transition can also be designed as a broad sight and protection edge 48, shown in FIG. 6. The terminal bend 39 here has a double bend, and it completely covers the transition to the switch cabinet proper.

As can also be seen in FIG. 4, the suspension positions for the external walls 25 are also positioned in such a manner that they are located outside of the external profile sides 13 in the free space of the external corner of the frame legs 12 and 11. It is also conceivable that, in the case of another angling-off of the internal walls 20, the external walls 25 can be directly hung on the rack 10.

The angling-off of the internal walls 20 shown in FIGS. 1–3 has the advantage that the angled-off walls do not unnecessarily increase the external dimensions of the switch cabinet. The internal walls 20 that are angled-off in the direction toward the internal space are received by the recesses of the opposing frames of the rack 10. Here the separation from the internal wall 20 to the external wall 25 can occupy a portion of the frame depth, as can be seen, in particular, in FIGS. 1–3. This frame depth is determined by the profile side 14 of the frame leg 12.

What is claimed is:

1. In a switch cabinet with a rack that is closed by means of at least one double-walled cabinet door, two side walls, a back wall and a top wall, where the side walls and the back wall each have an internal wall and an external wall and are attached to the rack and where a cover hood is placed onto the top wall, the cover hood being hinged near the back wall and fastenable near the at least one cabinet door in the closed position, the improvement comprising:

the external walls (25) of the side walls and the back wall having, at least in an area of upper edges, angled-off flanges (26) and the external walls carrying on internal sides suspension elements (46) hung in hanging receivers (22) of at least one of vertical frame legs (11) and the internal walls (20) connected to the rack (10), and the closed cover hood (31) with pressure elements (32) that are attached to terminal bends (39) of side walls (38) of the cover hood (31) supported on the flanges (26) of the suspended external walls (25).

2. In the switch cabinet according to claim 1, wherein the internal walls (20) are attached by screwing to the rack (10), angled-off sections (28) of the internal walls are supported on external profile sides (13) of the vertical frame legs (11) and second frame legs (12) of the rack (10) with a seal (43), and second angled-off sections (27) of the internal walls are introduced into reception spaces of a vertical frame of the rack (10).

3. In the switch cabinet according to claim 2, wherein the second angled-off sections (27) are oriented perpendicular to an associated one of the external walls (25) and run parallel to second profile sides (14) of the vertical frame legs (11) or the second frame legs (12), and are shielded with EMV sealing elements (42).

4. In the switch cabinet according to claim 3, wherein the terminal bends (39) of the side walls (38) of the cover hood (31) transition into the side walls (38) by way of projecting and lowered drip edges (47) that cover transitions formed between the terminal bends (39), the pressure elements (32), and the flanges (26) of the external walls (25).

5. In the switch cabinet according to claim 3, wherein the terminal bends (39) of the side walls (38) of the cover hood (31) transition into the side walls (38) by way of a sight and protection edge (48) which is angled-off at a doubled right angle downward and outward and that covers transitions formed between the terminal bends (39), the pressure elements (32) and the flanges (26) of the external walls (25).

6. In the switch cabinet according to claim 5, wherein the external walls (25) have at a horizontal top edge and vertical side edges the angled-off flanges (26), and near a horizontal lower edge the external walls (25) with the internal walls (20) form at least one air inlet opening.

7. In the switch cabinet according to claim 6, wherein the internal walls (20) that extend into the receiving space of the vertical frames of the rack (10) are at a predetermined distance from the external walls (25).

8. In the switch cabinet according to claim 7, wherein the external walls (25) form a ventilation gap leading to the angled-off sections (28) that cover the external profile sides (13), the gap opens into the closed cover hood (31), and the side walls (38) of the cover hood (31) have air outlet openings (50).

9. In the switch cabinet according to claim 8, wherein the suspension elements (46) are designed as bolts each with a bolt head at a free end of one of the bolts, and the hanging receivers (22) are designed as keyholes each having a top inlet opening matched to a diameter of the bolt head and where a width of the continuing retaining slots is adapted to the diameter.

10. In the switch cabinet according to claim 9, wherein the cover hood (31), in an opened state, is hinged at such a distance from the rack (10) that above the flange (26) of the one suspended external wall (25) that is used for the back wall, a vertical free space is formed for a hanging pathway of the one suspended external wall (25) with the flange (26).

11. In the switch cabinet according to claim 10, wherein a closed position of the cover hood (31) is secured by the closed at least one cabinet door (40).

12. In the switch cabinet according to claim 11, wherein each of the pressure elements (32) is designed as a seal and attached to one of the terminal bends (39) of the side walls (38) of the cover hood (31).

13. In the switch cabinet according to claim 11, wherein each of the pressure elements (32) is formed as an angle piece that is applied to the side walls (38) of the cover hood (31).

14. In the switch cabinet according to claim 1, wherein the terminal bends (39) of the side walls (38) of the cover hood (31) transition into the side walls (38) by way of projecting and lowered drip edges (47) that cover transitions formed between the terminal bends (39), the pressure elements (32), and the flanges (26) of the external walls (25).

15. In the switch cabinet according to claim 1, wherein the terminal bends (39) of the side walls (38) of the cover hood (31) transition into the side walls (38) by way of a sight and protection edge (48) which is angled-off at a doubled right angle downward and outward and that covers transitions formed between the terminal bends (39), the pressure elements (32) and the flanges (26) of the external walls (25).

16. In the switch cabinet according to claim 1, wherein the external walls (25) have at a horizontal top edge and vertical side edges the angled-off flanges (26), and near a horizontal lower edge the external walls (25) with the internal walls (20) form at least one air inlet opening.

17. In the switch cabinet according to claim 1, wherein the internal walls (20) that extend into a receiving space of the vertical frames of the rack (10) are at a predetermined distance from the external walls (25).

18. In the switch cabinet according to claim 1, wherein the external walls (25) form a ventilation gap leading to angled-off sections (28) that cover external profile sides (13) of vertical frame legs (11) and second frame legs (12) of the rack (10), the gap opens into the closed cover hood (31), and the side walls (38) of the cover hood (31) have air outlet openings (50).

19. In the switch cabinet according to claim 1, wherein the suspension elements (46) are designed as bolts each with a bolt head at a free end of one of the bolts, and the hanging receivers (22) are designed as keyholes each having a top inlet opening matched to a diameter of the bolt head and where a width of the continuing retaining slots is adapted to the diameter.

20. In the switch cabinet according to claim 1, wherein the cover hood (31), in an opened state, is hinged at such a distance from the rack (10) that above the flange (26) of the one suspended external wall (25) that is used for the back wall, a vertical free space is formed for a hanging pathway of the one suspended external wall (25) with the flange (26).

21. In the switch cabinet according to claim 1, wherein a closed position of the cover hood (31) is secured by the closed at least one cabinet door (40).

22. In the switch cabinet according to claim 1, wherein each of the pressure elements (32) is designed as a seal and attached to one of the terminal bends (39) of the side walls (38) of the cover hood (31).

23. In the switch cabinet according to claim 1, wherein each of the pressure elements (32) is formed as an angle piece that is applied to the side walls (38) of the cover hood (31).

* * * * *